(12) United States Patent
Ruckebusch et al.

(10) Patent No.: US 10,752,159 B2
(45) Date of Patent: Aug. 25, 2020

(54) OPTICAL MODULE FOR A MOTOR VEHICLE AND LOCKING IN POSITION OF A COMPONENT OF THE MODULE BY AN ELASTICALLY DEFORMABLE CLAMPING ELEMENT

(71) Applicant: VALEO VISION, Bobigny (FR)

(72) Inventors: Nicolas Ruckebusch, Bobigny (FR); Hugo Mestre, Bobigny (FR); Ibrahima Ndiaye, Bobigny (FR)

(73) Assignee: VALEO VISION, Bobigny (FR)

( * ) Notice: Subject to any disclaimer, the term of this patent is extended or adjusted under 35 U.S.C. 154(b) by 16 days.

(21) Appl. No.: 15/889,658

(22) Filed: Feb. 6, 2018

(65) Prior Publication Data

US 2018/0222379 A1    Aug. 9, 2018

(30) Foreign Application Priority Data

Feb. 6, 2017    (FR) ...................................... 17 50971

(51) Int. Cl.
*B60Q 1/04* (2006.01)
*B60Q 1/00* (2006.01)
(Continued)

(52) U.S. Cl.
CPC ......... *B60Q 1/0483* (2013.01); *B60Q 1/0029* (2013.01); *B60Q 1/0094* (2013.01); *F21S 45/43* (2018.01); *F21S 45/49* (2018.01)

(58) Field of Classification Search
CPC .. B60Q 1/0483; B60Q 1/0029; B60Q 1/0094; F21S 45/49; F21S 45/43; F21V 29/67; F21V 29/673; F21V 29/677
(Continued)

(56) References Cited

U.S. PATENT DOCUMENTS 4,427,249 A    1/1984    Bright et al.
6,401,806 B1   6/2002    Lee et al.
(Continued)

FOREIGN PATENT DOCUMENTS

DE    10 2010 045 848 A1    3/2012
DE    10 2013 017 022 A1    4/2015
(Continued)

OTHER PUBLICATIONS

French Preliminary Search Report dated Oct. 16, 2017 in French Application 17 50971, filed on Feb. 6, 2017 (with English Translation of Categories of cited documents).

*Primary Examiner* — Erin Kryukova
(74) *Attorney, Agent, or Firm* — Oblon, McClelland, Maier & Neustadt, L.L.P.

(57) ABSTRACT

An optical module, used for lighting and/or signalling purposes for a motor vehicle, includes a support delimiting a compartment for receiving a functional component such as a fan. A clamping element, preferably produced as a single part, can be used to block an opening of the compartment and lock the component in its operational position. The clamping element, separate from the support and provided with two arms, is engaged and clipped on against at least one engaging protrusion formed laterally on the support in order to achieve the locking. An elastic return effect of at least one of the two arms allows the clamping element to be engaged at the rear of the protrusion and held in place. For unlocking, a flexible actuation portion formed in the clamping element can be actuated in order to move one of the two arms outwards and allow unclipping to take place.

17 Claims, 4 Drawing Sheets

(51) Int. Cl.
*F21S 45/43* (2018.01)
*F21S 45/49* (2018.01)

(58) Field of Classification Search
USPC .......................................................... 248/674
See application file for complete search history.

(56) References Cited

U.S. PATENT DOCUMENTS

| | | | | |
|---|---|---|---|---|
| 6,893,149 | B2* | 5/2005 | Mock | ................... F21S 48/1109 |
| | | | | 362/519 |
| 7,628,521 | B1* | 12/2009 | Hsieh | ..................... F21S 41/192 |
| | | | | 362/519 |
| 9,534,755 | B2* | 1/2017 | Blandin | ................. F21S 41/192 |
| 2003/0002258 | A1 | 1/2003 | Manabe et al. | |
| 2003/0024688 | A1 | 2/2003 | Dowdy et al. | |
| 2005/0078228 | A1 | 4/2005 | Klemm et al. | |
| 2005/0180157 | A1* | 8/2005 | Watanabe | ............. F21V 19/004 |
| | | | | 362/543 |
| 2011/0128752 | A1* | 6/2011 | Herbers | .................. F21V 29/67 |
| | | | | 362/545 |
| 2013/0100685 | A1* | 4/2013 | Weekamp | .............. F21V 17/005 |
| | | | | 362/382 |
| 2013/0170244 | A1* | 7/2013 | Thullier | ................. B60Q 1/076 |
| | | | | 362/516 |
| 2014/0126214 | A1* | 5/2014 | Gebhard | ................. F21V 29/02 |
| | | | | 362/294 |
| 2014/0293625 | A1* | 10/2014 | Sato | ....................... H01L 23/467 |
| | | | | 362/382 |
| 2015/0176795 | A1* | 6/2015 | Kikuchi | ................. B60Q 1/076 |
| | | | | 362/523 |
| 2015/0349446 | A1 | 12/2015 | Zantout | |
| 2016/0201870 | A1 | 7/2016 | Ruckebusch | |
| 2017/0363255 | A1* | 12/2017 | Cuche | .............. F21V 23/06 |
| 2018/0335054 | A1* | 11/2018 | Scholz | ................. F04D 29/646 |
| 2018/0372149 | A1* | 12/2018 | Tajima | .................... F16H 25/20 |
| 2018/0372294 | A1* | 12/2018 | Inoue | .................... F21V 29/503 |

FOREIGN PATENT DOCUMENTS

| | | |
|---|---|---|
| EP | 3 043 107 A1 | 7/2016 |
| EP | 3 104 061 A1 | 12/2016 |
| KR | 20-2016-0000297 | 1/2016 |
| KR | 10-2016-0034682 | 3/2016 |

\* cited by examiner

OPTICAL MODULE FOR A MOTOR VEHICLE AND LOCKING IN POSITION OF A COMPONENT OF THE MODULE BY AN ELASTICALLY DEFORMABLE CLAMPING ELEMENT

The present invention concerns lighting for vehicles and assembly solutions for removably mounting components in headlamps. More specifically, the invention concerns, in the motor vehicle field, an optical module provided with a removable functional component and the use of a clamping part to attach such a component in an optical module.

Generally, such an optical module functions with a light source that has the disadvantage of emitting heat. It is therefore equipped with one or more components, the aim of which is to absorb and/or discharge this heat. This type of module is, for example, provided with a radiator for keeping the temperature of the module at a relatively low level, and a cooling component, typically in the form of a fan. In this way, the functioning of the optical module is not affected by an excessively high temperature.

The functional components added to optical modules are most often attached by several screws, as described, for example, in document WO2012/013591. Given that these modules are often difficult to access, screwing and unscrewing operations prove awkward when it is necessary to replace a component, for example a cooling component or another component that can be replaced.

The aim of the invention is to obtain an optical module, for example a lighting and/or signalling module, that facilitates the operations involved in replacing a component that is mounted removably.

To this end, the invention concerns an optical module for a motor vehicle, comprising:

a support that delimits a compartment that is accessible through an opening, a functional component, preferably electrically powered, designed and arranged to be housed in the compartment in an operational configuration of the functional component, by insertion through the opening in a general insertion direction, said direction allowing the component to be moved towards a back of the compartment opposite said opening and typically allowing the component to be engaged against said back, a clamping element separate from the support and provided with two arms; and at least one engaging protrusion, that is stationary relative to the support and preferably formed directly on the support, and on which the clamping element is held in engagement by an elastic return effect of at least one of the two arms, the at least one engaging protrusion allowing the clamping element to be clipped on, holding it in a clipped-on position adjacent to the support, with the particularity that the clamping element is designed and arranged, when clipped on, to retain and lock the functional component in the operational configuration, the clamping element having a flexible actuation portion for moving one of the two arms outwards and allowing the clamping element to be unclipped in a spaced-apart configuration, as a result of which the functional component can be removed from the compartment.

Due to these arrangements, the optical module has the advantage of being more flexible in maintenance operations, because the functional component, for example a fan, can be attached simply and quickly on the support of the optical module, and can be removed at any time just as easily. The clamping element is removed as a single-piece component, which is simpler that removing several screws.

In a preferred option, the clamping element is deformable by bending in such a way as to be able to shift:

from a resting configuration, in which the two arms are substantially parallel, to the spaced-apart configuration, in which the two arms are spaced further apart from each other than in the resting configuration.

According to one particularity, the at least one engaging protrusion comprises a projection formed on a side wall member of the compartment and that has a shoulder or an abutment surface, preferably formed at the rear of the engaging protrusion relative to the general insertion direction, in order to keep an arm associated with the clamping element in the clipped-on position.

According to one particularity, the at least one engaging protrusion comprises a projection formed on each of the two side wall members, parallel to the insertion direction, that delimit the compartment, each of the projections having a shoulder or an abutment surface, preferably formed at the rear of the engaging protrusion relative to the general insertion direction, in order to keep an arm associated with the clamping element in the clipped-on position.

According to one particularity, the support has two side wall members that delimit, between them, a space for receiving the functional component, the opening extending transversely between the two side wall members, the at least one engaging protrusion comprising a first protrusion protruding outwards formed on one of the two side wall members and a second protrusion protruding outwards formed on the other of the two side wall members, said two protrusions protruding radially outwards.

Preferably, each of the two arms of the clamping element ends with a portion folded inwardly and is respectively retained by one of the first and second protrusions in the clipped-on position, by means of the engagement of the portion folded inwardly with the rear of the corresponding protrusion.

According to one particularity, the clamping element has:

two arms that are distributed to either side of the opening of the compartment in the clipped-on position, and an intermediate base connecting the first arm and the second arm in such a way as to block or extend opposite the opening in the clipped-on position ("block" should be interpreted here in the broad sense of the term, and does not necessarily mean complete blocking).

According to one particularity, at least one of the two arms has a first, preferably substantially straight portion, that is extended at the side opposite the intermediate base by an immobilizing portion that connects to the first portion and defines, towards the inside of the clamping element, a set angle less than or equal to 120°, and preferably less than or equal to 90°. With this configuration, a portion of the arm can be formed that has an inward orientation substantially parallel to the intermediate base and well suited for engaging against a shoulder or an abutment surface formed on a side wall of the compartment.

According to one particularity, the immobilizing portion is an intermediate portion between the first portion and a second C- or J-shaped portion defining a free end of the arm.

According to one particularity, the intermediate base of the clamping element has a change of curvature and is arched inwardly, so as to define an inwardly arched portion.

According to one particularity, the intermediate base is connected to one and/or the other of the two arms by a rounded corner, the intermediate base and/or the rounded corner being elastically deformable in order to allow the arm connected to the corner to be moved reversibly outwards.

An optical module according to the invention can comprise one or more of the following features:

- the corner has a through-hole, as a result of which the corner defines the flexible actuation portion in order to move the corresponding arm outwards, the outward movement being obtained in response to the insertion of an end of a disassembly tool, such as a screwdriver, through the through-hole between a side wall member of the compartment and the arm (the local action through the through-hole, against the return effect, with a tool inserted between one arm of the clamping element and the side wall, is well suited for moving the arm radially outwards, due to the corner).
- the clamping element can be actuated by pushing/pressure exerted in the insertion direction in order to obtain the outward movement of one and/or the other of the two arms, followed by the clipped-on position.
- the clamping element has two rounded corners and, in a cross section of the clamping element, the intermediate base has a curvature in the opposite direction to that of the two rounded corners.
- the optical module comprises a light source positioned in an optical cavity at least partially delimited by the support and optical means for converting radiation from a light source into an outgoing light beam.
- the functional component is separate from the optical means and the compartment is separated from the optical cavity.
- the clamping element is produced as a single part, preferably made from metal.
- the functional component is a cooling component, preferably a fan.
- the optical module comprises a light source.
- the functional component comprises a control circuit connected with all or part of the light source.
- the light source comprises at least one light-emitting diode.
- the optical module comprises a support provided with a portion produced as a single part that defines the compartment.
- the optical module is provided with a radiator, preferably made from folded sheet metal, with pure aluminium having good heat conduction, which improves the performance in terms of controlling the temperature.
- the optical module comprises a reflection assembly defined by several reflector elements, the light source being positioned opposite a reflector element of the reflection assembly that is formed by a support portion of the optical module.
- the optical module has a lens defining an optical axis and allowing an outgoing beam to be transmitted, the insertion direction being substantially parallel to the optical axis.

Another aim of the invention is to propose a headlamp for a motor vehicle, comprising a headlamp housing and an optical module according to the invention in order to carry out a lighting and/or signalling function.

The invention also proposes the use, in an optical module for a motor vehicle, of a clamping element, preferably produced as a single part, in order to lock a fan in an assembly position in which the fan is rigidly connected to a support of the optical module, with the knowledge that it is possible, once the fan has been inserted in a general insertion direction into a receiving compartment defined by the support, through an opening in this compartment:

to engage and clip on the clamping element, separate from the support and provided with two arms, against at least one engaging protrusion that is stationary relative to the support and preferably formed directly on the support, such that the clamping element occupies a position adjacent to the support to lock the assembly position and is held in engagement against the engagement protrusion or protrusions by an elastic return effect of at least one of the two arms, to unlock the assembly position of the fan, by actuating at least one flexible actuation portion formed in the clamping element in order to move at least one of the two arms outwards and allow the clamping element to be unclipped in a spaced-apart configuration.

Options also propose the use of the clamping element to lock the assembly position of a functional component other than a fan, for example a control circuit or a plate with a lighting function. It is understood that the clamping element can allow the insertion and removal of the functional component in the same way as a drawer.

Other features and advantages of the invention will be disclosed in the description that follows of several of its embodiments, provided as non-limiting examples in reference to the appended drawings in which.

Elements that are identical or similar have been given the same references in the different figures.

Figure 1:
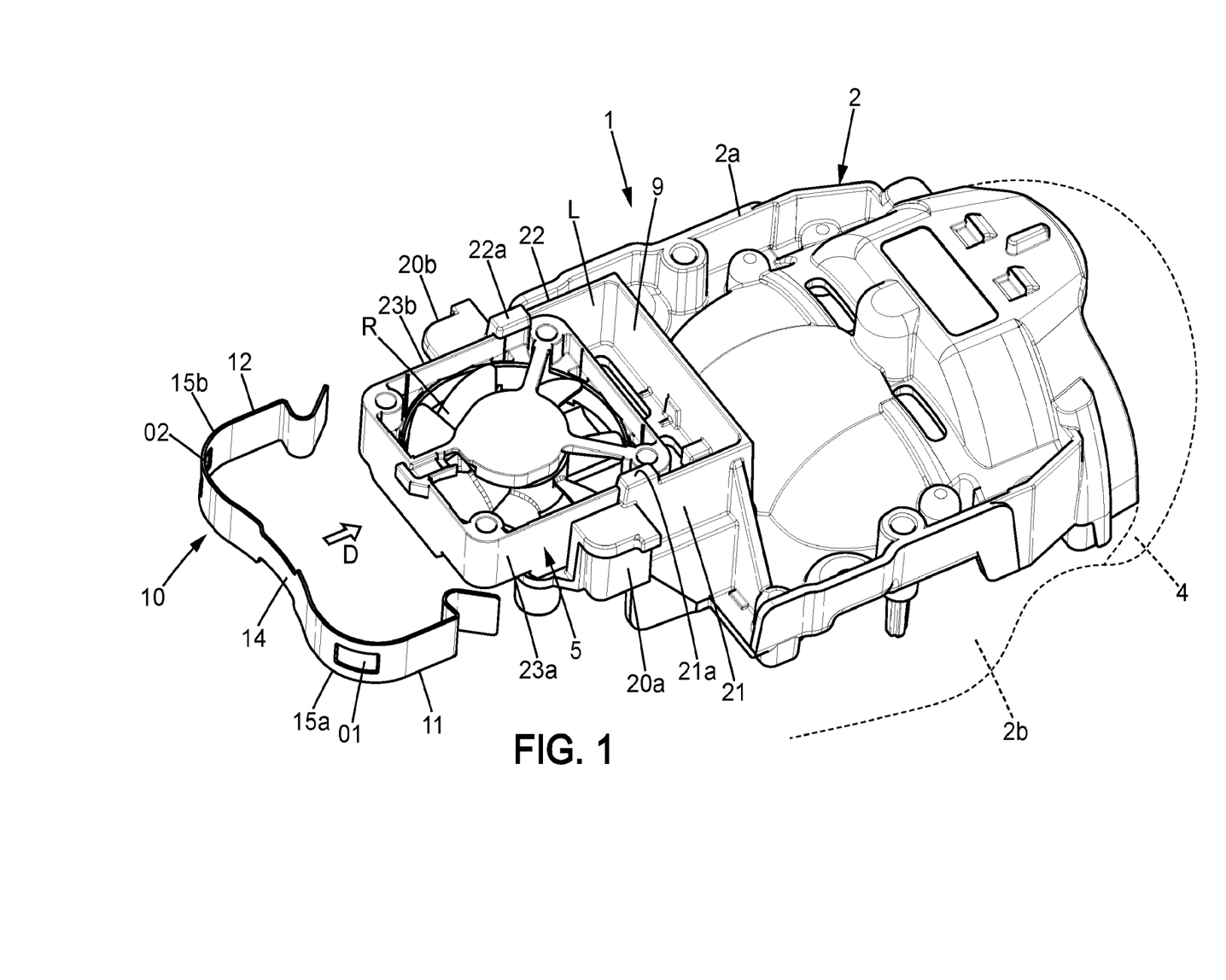
FIG. 1 is a perspective view showing portions of an optical module according to a preferred embodiment of the invention, during the insertion of a functional component into a receiving compartment of the optical module.
Figure 2:
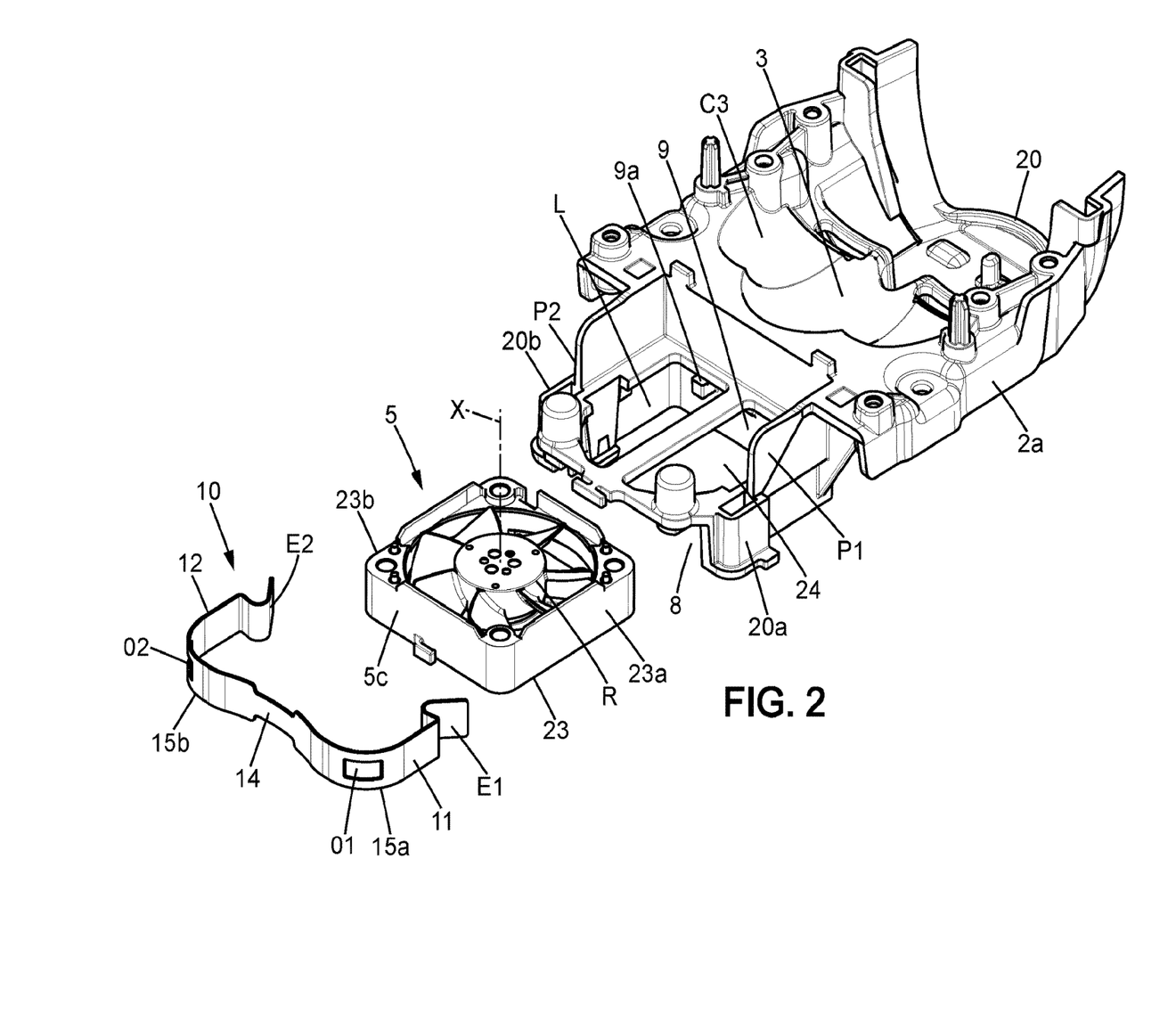
FIG. 2 is an exploded perspective view, upside-down relative to that of FIG. 1, showing the receiving compartment formed in a support portion belonging to the module, before the insertion of the functional component.

In reference to FIGS. 1 and 2, the optical module 1 can be used, for example, to carry out a lighting and/or signalling function towards the outside of a motor vehicle. For this purpose, the module 1 comprises, as is known per se, a support 2, a light source (not shown), reflector means including a fixed reflection surface 3 formed in the support 2 and other optional elements for shaping the optical beam and an optical lens 4 formed at an outlet end of the module 1. The support 2 can have two additional portions 2a and 2b, which can facilitate assembly by holding the optical lens 4 between these two portions 2a and 2b, and/or facilitate the prior assembly of the light source and certain reflective portions on one of the two portions 2a and 2b.

In certain options, the support 2 can be as described in document WO2012/013591. Therefore, in the interest of concision, the way in which the light source and reflectors can be assembled on and associated with the support 2 will not be described, and the method used to attach an optical reflector or other similar reflector element provided to deflect and mask the beam is not shown.

Behind the optical lens 4, preferably at the side of a rear end of the optical module 1 opposite the front end, there is also provided a removably mounted functional component, in this case a fan 5, and a heat exchanger 6, such as, for example, a radiator provided with one or more heat-dissipating surfaces 36. The support 2 comprises means 20 for positioning and attaching the optical lens 4 to the support 2. These means cooperate with positioning and attachment means provided on the optical lens 3. The optical lens 4 is thus supported by the support 4. Preferably, the optical lens 4 is supported directly by the support 2.

Figure 5:
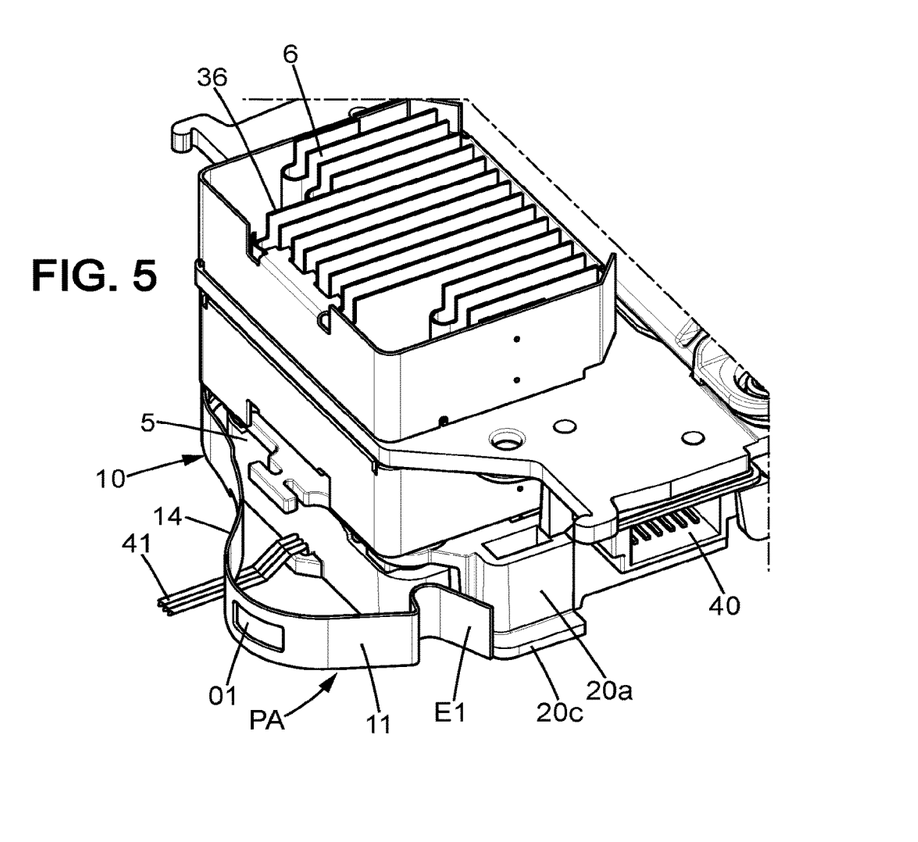
FIG. 5 is a perspective view showing a stacked configuration in the optical module, between a heat exchanger and a fan mounted removably according to an embodiment of the invention, during a phase of unclipping the clamping element.

In reference to FIG. 5, the support 2 can comprise or support a connection assembly for positioning and attaching the heat exchanger 6 on the support 2, such that the heat exchanger 6 is rigidly connected to the support 2 in a mounted state. Preferably, the fan 5 and the heat exchanger 6 are aligned in a direction perpendicular to the optical axis of the module 1 and stacked one on top of the other, so as to cooperate to effectively lower the temperature of the optical module 1. In particular, the fan 5 produces an air flow sent to the heat-dissipating surface or surfaces 36 provided in the optical module 1.

In FIGS. 1 and 2, in particular, it can be seen that the support 2 defines a compartment L designed to receive the fan 5. This compartment L has a back 9 opposite an opening 8 through which the fan 5, the format of which is in this case substantially parallelepipedal, can be inserted. The opening 8 side thus forms an entrance of the compartment L. Naturally, the format of the fan 5 can be modified, for example with a more circular or rounded format, or in the form of a polygon with more than four sides, or a combination of a polygonal format and one or more curved faces. In such variants, the shape of the compartment L can also match the external contours of the fan 5, while allowing insertion by sliding.

In reference to FIG. 5, an electrical connector 40 can optionally be provided next to the fan 5, for example on a lateral side different to the opening 8 side. The fan 5 can have a power link 41 connecting to a rear face 5c of the fan 5, formed by the stator 23 and oriented towards the opening 8 side.

In the optical module 1, a light source can be positioned in an optical cavity C3 or emit radiation into such an optical cavity C3, at least partially delimited by the support 2. Optical means of a type known per se, provided in the cavity C3, make it possible, for example, to convert the radiation from the light source into an outgoing light beam. The compartment L is separated from such an optical cavity C3.

The compartment L shown in FIGS. 1 and 2 is delimited between two parallel members 21 and 22, referred to hereinafter as side wall members 21 and 22, which join a transverse wall that defines the back 9. In order not to impede the flow of air in a direction parallel to the axis of rotation X of a bladed rotor R of the fan 5, the main opposing faces (typically forming the top and the bottom) of the compartment L can be perforated. The chassis forming the stator 23 of the fan 5 can define a frame surrounding the rotor R, with four outer faces, including two lateral outer faces 23a and 23b that are suitable for guiding the fan 5, by cooperating with the corresponding inner surfaces formed in the side wall members 21 and 22.

In reference to FIG. 1, one or two guide lugs 21a and 22a can protrude inwardly, relative to the inner surfaces of the side wall members 21 and 22, in this case on the top side, to guide and hold the fan 5 pressed against a perforated bottom wall of the compartment L. Such lugs 21a and 22a can act as a substitute for a top wall, thus allowing air to enter the compartment L through the whole of the top face of the compartment. A similar arrangement can be adopted for the bottom face delimiting the compartment L.

Figure 3:
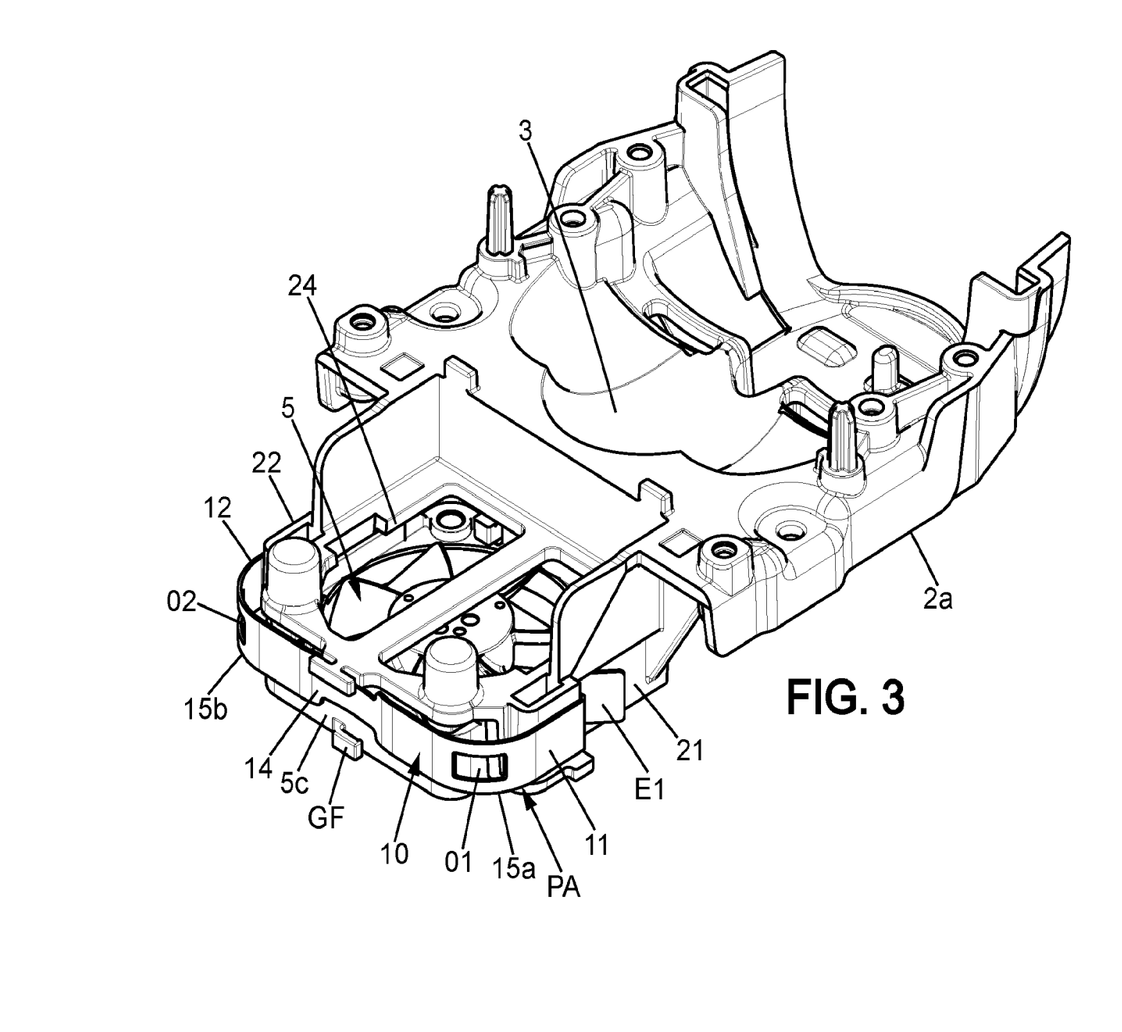
FIG. 3 is a perspective view showing the same elements as those shown in FIG. 2, in an assembled state with the component locked in the receiving compartment.

As clearly shown in FIGS. 2 and 3, the bottom wall can have several large through-openings 24 for the air set in motion by the rotor R of the fan 5 to pass through. On the opening 8 side, there are no obstacles preventing the insertion of the fan 5 when it is oriented such that its axis of rotation X is parallel to the side wall members 21 and 22 and perpendicular to a predefined insertion direction D. However, a poka-yoke system can optionally be provided to allow the fan 5 to be received only if the shape of same matches a specific member provided in the compartment L and, optionally, only if the fan 5 is turned in a specific direction, always with the same face turned towards the top side of the compartment L.

As a non-limiting example, a guide member 9a can be provided on the back 9 side to index the end of the translational movement inserting the fan 5 into the compartment L, and also to form a poka-yoke when the fan 5 needs to be arranged with a specific orientation.

In the example shown, the fan 5 is a functional component mounted on a portion 2a of the support 2 by insertion through the opening 8 in an insertion direction D, moving towards the back 9 until optionally coming into abutment on this back 9. This insertion direction D can be straight, as in the example shown in FIG. 1. However, in variants, the insertion of the functional component can involve modifications in the direction and/or relative defined play, for example translational play in two spatial directions perpendicular to each other and to the insertion direction D.

The engagement of the fan 5 is shown here only as an example, and it should be noted that the method of inserting the fan 5 that is described is a specific case that applies to any functional component that needs to be removably mounted in a compartment L of the support 2. The same applies to the locking method described below.

Figure 4:
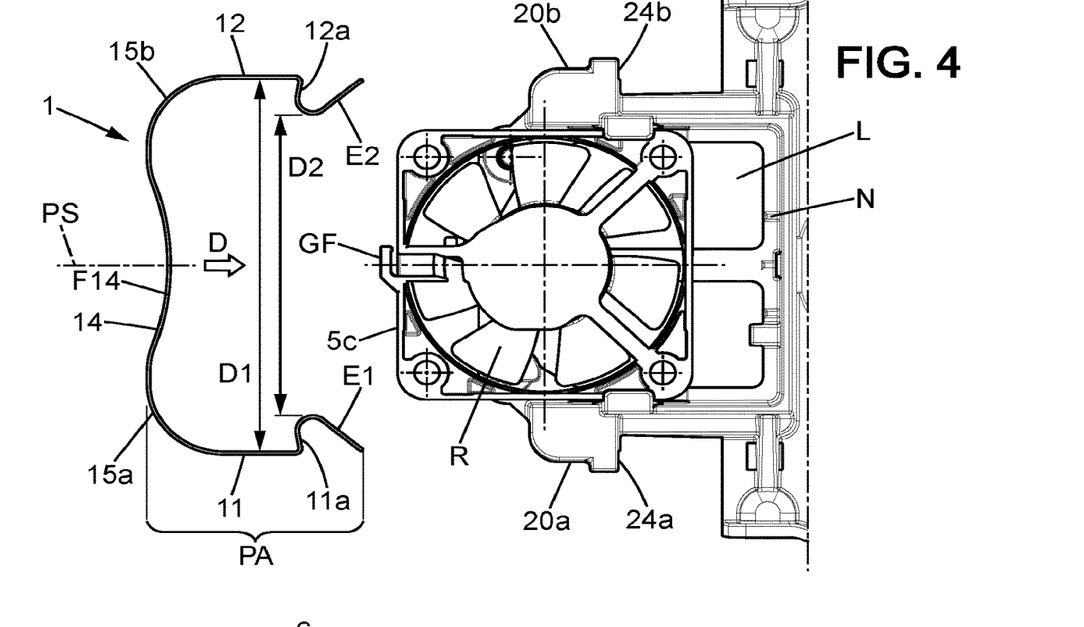
FIG. 4 is a top view showing the insertion of the functional component before it is locked by the clamping element.

In reference to FIGS. 2, 3 and 4, the optical module 1 comprises a clamping element 10 typically formed by a part that can be separated from the support 2, in this case a thin, elastically deformable metal part. The clamping element 10 has, for example, a thickness less than or equal to 2 mm, at least in the bending areas of this element. As clearly shown in FIG. 4, the clamping element 10 has two arms 11 and 12 that can be symmetrical to each other. A plane of symmetry PS of the clamping element 10 separates two halves that can be identical. The clamping element 10 can therefore be used without the risk of being incorrectly positioned, which is not the case in an arrangement with arms that are not symmetrical.

During assembly, the fan 5 can be held by friction, for example by using inner ribs N, when it is fully inserted into the compartment L in the insertion direction D. More generally, if there is relative rotational and/or translational play at the start of insertion into the compartment L, such play can advantageously be reduced as the fan 5 (or other functional component/module) is subsequently moved towards the back 9, for example in an increasing manner until the relative translational and/or rotational play has been eliminated or reduced to minimal relative residual play, at the latest when the position of operation is reached.

If applicable, the power link 41 can be engaged in a groove defined by the guide GF formed on the side of a face of the stator 23 that defines a rear face according to the insertion direction D. This guiding can allow the power link 41 to be positioned in a lowered or raised position that prevents any interference with the clamping element 10 when the latter is brought closer and engaged in order to cover the opening 8.

In reference to FIG. 4, the first arm 11 and the second arm 12 each have a free end E1 and E2 that has, as a result of one or more flexible areas, a certain amount of deflection in a radial direction perpendicular to the plane of symmetry PS. Each of the two arms 11 and 12 ends here with a portion (11a and E1; 12a and E2) folded inwardly in order to perform a retaining function, by engaging on corresponding engagement protrusions 20a and 20b provided on the side wall members 21 and 22. Each engaging protrusion 20a and 20b, formed directly on the support 2, for example, can have a rear face 24a and 24b produced by a shoulder in the side wall member 21 and 22, for example.

The minimum distance D2 between the arms 11 and 12 is, in this case, measured perpendicular to the plane of symmetry PS, between the portions folded inwardly. The maximum distance D1 between the arms 11 and 12, measured in the same direction, can correspond to the distance between two first portions that are directly connected to the corners 15a and 15b, and are in this case straight and parallel to each other. The distances D1 and D2 are naturally those measured in the resting, non-spaced apart configuration of the clamping element 10. The following equation can be satisfied: 9 mm<D1−D2<35 mm.

As clearly shown in FIG. 3, after mounting the fan 5, the clamping element 10 can be retained by the two engaging protrusions 20a and 20b, and held in engagement by an elastic return effect, in this case by each of the two arms 11 and 12. The clamping element 10 has an intermediate base 14 between the arms 11 and 12, intended to be urged against the rear face 5c of the fan 5 when the fan 5 is mounted and locked in an operational position in the compartment L. In this non-limiting example, the intermediate base 14 is linked to each of the two arms 11 and 12 by a rounded corner 15a and 15b that is elastically deformable in order to provide a hinge effect about an axis perpendicular to the insertion direction D. The intermediate base 14 extends transverse to the plane PS. In certain variants, this intermediate base 14 can be shorter, or indeed eliminated, for example if the rear face 5c is significantly narrower than the width of the fan 5 or convex or if it has chamfers in a direction transverse to the plane PS.

In the example shown, the hinge effect is produced about an axis parallel to the axis of rotation X and allows the clamping element 10 to be opened wider. In other words, it is possible to obtain, between the portions folded inwardly, a minimum distance of spacing between the arms 11 and 12 that is significantly increased, for example increased by at least (D1−D2)/2, the distance once again being measured here perpendicular to the plane of symmetry PS or comparable median place.

In FIG. 4, it can be seen that the distance D2 is too short to allow the clamping element 10 to move into the locking position that can be seen in FIG. 3, meaning that the two arms 11 and 12 of the clamping element 10 need to be deformed in order for the latter to be installed. In order to facilitate this installation, the free ends E1 and E2 are formed at an angle to define oblique ramps, which move away from the plane PS from the fold area where the minimum distance D2 is defined. This configuration allows the arms 11 and 12 to be gradually moved apart, each ramp acting as a cam follower when contact is made against a fixed axial surface (similar to a cam surface) defined by the opposing protrusion 20a or 20b. The moving apart is made possible by deformation of the corners 15a and 15b and/or of the intermediate base 14, which allows the forward movement of each ramp in the insertion direction to be converted into a rotational movement that moves the arms 11 and 12 outwards.

In FIGS. 1 to 3, it can be seen that the intermediate base 14 can be narrowed, at least partially, relative to the corners 15 and 15b, which increases the flexibility in this area of the clamping element 10 and makes it easier to move the arms 11 and 12 significantly away from each other.

The folded portion 11a and E1 of a first arm 11 and the folded portion 12a and E2 of the second arm 12 can slide, by contact against the corresponding protrusion 20a and 20b, into a spaced-apart configuration of the clamping element 10. At least one longitudinal guide lug 20c can be provided in a position adjacent to the protrusion 20a and 20b or in an edge portion of this protrusion 20a and 20b. In this case, such a lug 20c protrudes and is provided on each of the opposing protrusions 20a and 20b, in order to eliminate or limit relative rotational play of the clamping element 10 when one and/or the other of the arms 11 and 12 are spaced apart. This helps centre the clamping element 10 relative to the opening 8 to be blocked and keep the symmetry plane PS or similar median plane of same in a centred position, such that this plane PS remains parallel to the axis of rotation X of the fan 5 in the case shown.

The two arms 11 and 12 are described here as being parallel to each other in a resting configuration and further apart from each other in the spaced-apart configuration. More generally, the arms 11 and 12, whether parallel to each other or not in the resting configuration, can advantageously have the same ability to shift from a rest position that allows clamping to take place, with axial immobilization on the side of the ends of the arms 11 and 12, to a position in which they are spaced further apart that allows an axial movement in the insertion direction D and the opposite direction.

The clamping element 10 stops sliding at both sides of the compartment L when the folded portions of the arms 11 and 12 have moved past the corresponding protrusion 20a and 20b. Owing to a spring effect, the corners 15a and 15b return to their initial shape and these folded portions 11a and E1 and 12a and E2 engage at the rear of the protrusions 20a and 20b, against the faces 24a and 24b. In this way, the clamping element 10 then blocks the opening 8, and the fan 5 is locked in the operational position, mounted in the compartment L. For example, the clamping element is returned to its initial configuration, in which the minimum distance D2 between the arms 11 and 12 is the same as in FIG. 4. It is understood that locking can result from an essentially linear movement of the clamping element 10, the latter being capable of being pushed only at the intermediate portion or base 14 of same, for example on a slightly concave face F14 of this intermediate base 14, facing the opposite direction to the insertion direction D, as shown in FIGS. 1 and 4.

In the non-limiting example shown, each portion folded inwardly of an arm 11 or 12 includes a radial immobilizing section 11a and 12a that is transverse to the plane of symmetry PS of the clamping element 10. Such a radial section 11a and 11b engages against a rear face 24a and 24b of the protrusion 20a and 20b at the end of installation of the clamping element 10, in a clipped-on position of this clamping element 10. The overall U-shape of this clamping element 10 allows the support 2 to be held as closely as possible, along three lateral sides of the compartment L.

As clearly shown in FIG. 4, each radial immobilizing section 11a and 12a extends in an intermediate manner between the first, in this case straight, portion of the arm in question and the free end E1 or E2 of the arm defined in the form of a second C- or J-shaped portion. The first portion of each arm, forming the portion closest to the corner 15a and 15b, can be parallel to the plane of symmetry PS and is typically oriented in the insertion direction D when the clamping element 10 is being installed and in the process of engaging externally against the side walls 21 and 22 of the compartment L.

The clamping element 10, which is preferably metal, is produced, for example, as a single part. It has sufficient shape memory and reversibility for the distances D1 and D2 to remain substantially the same after several deformation operations obtaining a spaced-apart configuration of the clamping element 10. Naturally, it is possible to produce only a portion of the clamping element 10 from metal, for example one and/or the other of the arms 11 and 12 with the associated corner 15a and 15b.

The unlocking operation will now be described in greater detail in reference to FIGS. 1, 3 and 5.

In reference to FIG. 3, in particular, it can be seen that each corner 15a and 15b has a through-hole O1 and O2 that opens at a contact area between a wall member 21 and 22 and the first, in this case straight, portion of one of the arms 11 and 12. The through-hole O1 and O2 is oriented towards and accessible from the same side as the intermediate base 14, i.e. the rear. However, the through-hole O1 and O2 can be formed in a corner area, so as to be able to modify the orientation of a straight working portion of a disassembly tool that is inserted through said hole O1 and O2. In particular, this can allow lateral deflection, from the intermediate base 14 towards the closest arm 11 and 12 or in the other direction. For this purpose, the through-hole O1 and O2 can typically be elongate in a direction moving away from the intermediate base 14.

The through-hole O1 allows the arrangement constituted by the corner 15a and the associated arm 11 to define a flexible actuation portion PA, that can move away from the plane PS during the installation of the clamping element 10. More specifically, inserting an end of a disassembly tool, such as a screwdriver, through the through-hole O1 and between the side wall member 21 and the arm 11, makes it possible to move the arm 11 radially outwards. This has the effect of unclipping the clamping element 10, as clearly shown in FIG. 5, the corresponding folded portion 11a and E1 being able to disengage from the protrusion 20a formed laterally on the support 2.

Naturally, it is also possible to provide another through-hole O2, allowing the arrangement constituted by the corner 15b and the associated arm 12 to define another flexible actuation portion. It is understood that inserting an end of a disassembly tool, such as a screwdriver, through the through-hole O2 and between the side wall member 22 and the arm 12, makes it possible to move the arm 12 radially outwards. As in the preceding case described in which the through-hole O1 is used, this has the effect of unclipping the clamping element 10 by disengaging it from the corresponding protrusion 20b formed externally on the side wall member 22.

In reference to FIG. 5, the clamping element 10 can be deformed and unclipped without the need for tedious screwing operations, by means of a simple lever effect applied via an ordinary tool, typically a flat-head screwdriver. Passing through a spaced-apart configuration, the deformed clamping element 10 is unclipped at least at one side, resulting in unlocking.

When the clamping element 10 has been completely removed, the fan 5 can be taken out of the compartment L by simply pulling it in the opposite direction to the insertion direction D. In its operational position, the fan 5 can optionally project beyond the side wall members 21 and 22 at the opening 8 side, in order to allow a rear end of the fan 5 to be gripped more easily during a removal operation.

The optical module 1 can be part of a headlamp for a motor vehicle, for example being accommodated in a headlamp housing, in order to perform at least a lighting and/or signalling function.

One of the advantages of the module 1 is to allow the optical module 1 to be assembled and disassembled easily, and in a manner compatible with installation locations that are difficult to access, for example from the rear of the headlamp in a vehicle. Such an optical module 1 facilitates the replacement of a functional component that can be replaced.

The generally U-shaped design of the clamping element 10, which does not cover the main faces of the compartment L, means that cooling performances are not adversely affected by locking a fan 5 in position. The clamping element 10 can consist of a metal strip producing a spring effect that facilitates engagement at the rear of the protrusions 20a and 20b when locking.

It should be obvious to a person skilled in the art that the present invention allows embodiments in many other specific forms without departing from the field of application of the invention as claimed.

Therefore, although the figures show a symmetrical shape of the clamping element 10 that corresponds to a preferred option, this clamping element 10 can have one arm that is different or shorter than the other. Similarly, if applicable, one of the arms 11 and 12 may not engage at the rear of a protrusion 20a and 20b and move outwards in order to be unclipped, but may instead cooperate in a different manner in order to allow the clamping element 10 to be held in position. If applicable, such an arm can be held in a fixed position by magnetic attachment, friction or shape engagement, optionally being guided into position along the side wall of the compartment L.

The invention claimed is:
1. An optical module for a motor vehicle, comprising:
a support which at least partially delimits an optical cavity configured to receive radiation emitted from a light source and convert said radiation into an outgoing light beam, wherein the support further delimits a compartment that is accessible through an opening,
an electrically-powered functional component comprising a fan designed and arranged to be housed in the compartment in an operational configuration of the functional component, by insertion through the opening in a general insertion direction, the functional component being retained and locked in the operational configuration by a clamping element which is separate from the support and provided with two arms; and
at least one engaging protrusion that is stationary relative to the support and formed directly on the support, and on which the clamping element is held in engagement by an elastic return effect of at least one of the two arms, said at least one engaging protrusion allowing the clamping element to be clipped thereon, holding the clamping element in a clipped-on position adjacent to the support, wherein the clamping element is arranged, when in the clipped on position, to engage the at least one engaging protrusion and thereby retain and lock the functional component in the operational configuration, the clamping element having a flexible actuation portion for moving one of the two arms outwards and allowing the clamping element to be unclipped from the at least one engaging protrusion in a spaced-apart configuration.

2. The optical module according to claim 1, in which the clamping element is deformable by bending in such a way as to be able to shift:
  from a resting configuration, in which the two arms are substantially parallel,
  to said spaced-apart configuration, in which the two arms are spaced further apart from each other than in the resting configuration.

3. The optical module according to claim 2, in which the two arms are distributed to either side of the opening of the compartment in the clipped-on position, the clamping element comprising an intermediate base connecting the first arm and the second arm in such a way as to block or extend opposite the opening in the clipped-on position.

4. The optical module according to claim 2, in which the support has two side wall members that delimit, between them, the compartment housing the functional component, the opening extending transversely between the two side wall members, said at least one engaging protrusion comprising a first protrusion protruding outwards formed on one of the two side wall members and a second protrusion protruding outwards formed on the other of the two side wall members, each of the two aims of the clamping element being respectively retained by one of the first and second protrusions in the clipped-on position.

5. The optical module according to claim 2, wherein the functional component is separate from the optical member and the compartment is separated from the optical cavity.

6. The optical module according to claim 2, in which the clamping element is produced as a single part made from metal.

7. The optical module according to claim 2, wherein the light source generates heat.

8. A headlamp for a motor vehicle, comprising a headlamp housing and an optical module according to claim 2 in order to perform a lighting and/or signalling function.

9. The optical module according to claim 1, in which the two arms are distributed to either side of the opening of the compartment in the clipped-on position, the clamping element comprising an intermediate base connecting a first of the two arms and a second of the two arms in such a way as to block or extend opposite the opening in the clipped-on position.

10. The optical module according to claim 9, in which the intermediate base is connected to one and/or the other of the two arms by a rounded corner, the intermediate base and/or the rounded corner being elastically deformable in order to allow the arm to which the corner is connected to be moved reversibly outwards.

11. The optical module according to claim 10, in which the corner has a through-hole, as a result of which the corner and the adjacent arm define said flexible actuation portion in order to move the corresponding arm outwards, the outward movement being obtained in response to the insertion of an end of a disassembly tool through the through-hole between a side wall member of the compartment and the adjacent arm.

12. The optical module according to claim 1, in which the support has two side wall members that delimit, between them, the compartment having the functional component, the opening extending transversely between the two side wall members, said at least one engaging protrusion comprising a first protrusion protruding outwards formed on one of the two side wall members and a second protrusion protruding outwards formed on the other of the two side wall members, each of the two aims of the clamping element being respectively retained by one of the first and second protrusions in the clipped-on position.

13. The optical module according to claim 1, wherein the functional component is separate from the optical member and the compartment is separated from the optical cavity.

14. The optical module according to claim 1, in which the clamping element is produced as a single part made from metal.

15. The optical module according to claim 1, wherein the light source generates heat.

16. A headlamp for a motor vehicle, comprising a headlamp housing and an optical module according to claim 1 in order to perform a lighting and/or signaling function.

17. A method for locking and unlocking a fan in an assembly position in a support of an optical module for a motor vehicle using a clamping element, the method comprising:
  providing the clamping element as a single part separate from the support and provided with two arms,
  inserting the fan in a general insertion direction through an opening in the support and into a receiving compartment defined by the support, the receiving compartment being distinct from an optical cavity delimited by the support configured to receive radiation emitted from a light source and convert said radiation into an outgoing light beam,
  engaging the clamping element with the support by clipping the clamping element on against at least one engaging protrusion that is stationary relative to the support and formed directly on the support, such that the clamping element occupies a position adjacent to the support and thereby locking the fan in the assembly position in the receiving compartment and holding the clamping element in engagement against said at least one engaging protrusion by an elastic return effect of at least one of the two arms of the clamping element, and
  unlocking the assembly position of the fan by actuating a flexible actuation portion of the clamping element thereby moving at least one of the two arms outwards into a spaced-apart configuration and allowing the clamping element to be unclipped from the support in the spaced-apart configuration.

\* \* \* \* \*